(12) United States Patent
Wang et al.

(10) Patent No.: US 10,075,997 B2
(45) Date of Patent: *Sep. 11, 2018

(54) ENCODED INFORMATION READING TERMINAL WITH USER-CONFIGURABLE MULTI-PROTOCOL WIRELESS COMMUNICATION INTERFACE

(71) Applicant: HAND HELD PRODUCTS, INC., Fort Mill, SC (US)

(72) Inventors: Ynjiun Paul Wang, Cupertino, CA (US); Huyu Qu, San Jose, CA (US); James T. Sauerwein, Charlotte, NC (US)

(73) Assignee: HAND HELD PRODUCTS, INC., Fort Mill, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/712,226

(22) Filed: Sep. 22, 2017

(65) Prior Publication Data
US 2018/0014350 A1 Jan. 11, 2018

Related U.S. Application Data

(60) Continuation of application No. 15/338,501, filed on Oct. 31, 2016, now Pat. No. 9,775,190, which is a
(Continued)

(51) Int. Cl.
*G06K 7/10* (2006.01)
*H04W 80/06* (2009.01)
(Continued)

(52) U.S. Cl.
CPC ............ *H04W 80/06* (2013.01); *G06K 7/01* (2013.01); *G06K 7/10297* (2013.01); *H04B 1/40* (2013.01);
(Continued)

(58) Field of Classification Search
CPC .......... G06K 7/10891; G06K 7/10881; G06K 7/10851; G06K 7/107725; G06K 17/0022; G06F 7/1008; G06Q 20/341
(Continued)

(56) References Cited

U.S. PATENT DOCUMENTS

| | | |
|---|---|---|
| 4,774,715 A | 9/1988 | Messenger |
| 4,825,058 A | 4/1989 | Poland |

(Continued)

FOREIGN PATENT DOCUMENTS

| | | |
|---|---|---|
| EP | 2061285 A2 | 5/2009 |
| WO | 98/14023 A1 | 4/1998 |

OTHER PUBLICATIONS

Otis et al; "An Ultra-Low Power MEMS-Based Two-Channel Transceiver for Wireless Sensor Networks;" 4 pp.; published in VLSI Circuits, 2004. Digest of Technical Papers; Jun. 17-19, 2004.
(Continued)

*Primary Examiner* — Karl D Frech
(74) *Attorney, Agent, or Firm* — Oliff PLC; R. Brian Drozd

(57) ABSTRACT

An apparatus may include a microprocessor and a wireless communication interface configured to perform at least one of receiving a first radio signal or transmitting a second radio signal. The microprocessor may be configured to execute at least one of a base-band encoder software program or a base-band decoder software program. The apparatus may be further configured to execute a wireless communication protocol selector software program that may be configured to optimize a value of a user-defined criterion in order to dynamically select at least one of a wireless communication network, a wireless communication protocol, and a parameter of a wireless communication protocol.

20 Claims, 9 Drawing Sheets

Related U.S. Application Data continuation of application No. 14/964,718, filed on Dec. 10, 2015, now Pat. No. 9,485,802, which is a continuation of application No. 14/560,043, filed on Dec. 4, 2014, now Pat. No. 9,231,644, which is a continuation of application No. 14/199,120, filed on Mar. 6, 2014, now Pat. No. 8,919,654, which is a continuation of application No. 13/430,121, filed on Mar. 26, 2012, now Pat. No. 8,708,236, which is a division of application No. 12/567,158, filed on Sep. 25, 2009, now Pat. No. 8,141,784.

(51) Int. Cl.
  *H04L 29/08* (2006.01)
  *H04B 1/401* (2015.01)
  *H04W 88/06* (2009.01)
  *H04B 1/40* (2015.01)
  *G06K 7/01* (2006.01)

(52) U.S. Cl.
  CPC ............ *H04B 1/401* (2013.01); *H04L 67/02* (2013.01); *H04W 88/06* (2013.01)

(58) Field of Classification Search
  USPC ............ 235/462.44, 462.45, 462.46, 472.01, 235/472.02, 472.03, 380
  See application file for complete search history.

(56) References Cited

U.S. PATENT DOCUMENTS

| | | |
|---|---|---|
| 4,868,375 A | 9/1989 | Blanford |
| 5,101,406 A | 3/1992 | Messenger |
| 5,256,865 A | 10/1993 | Wike, Jr. et al. |
| 5,347,113 A | 9/1994 | Reddersen et al. |
| 5,510,606 A | 4/1996 | Worthington et al. |
| 5,579,341 A | 11/1996 | Smith et al. |
| 5,610,595 A | 3/1997 | Garrabrant et al. |
| 5,793,903 A | 8/1998 | Lopresti et al. |
| 5,802,179 A | 9/1998 | Yamamoto |
| 5,812,605 A | 9/1998 | Smith et al. |
| 5,815,811 A | 9/1998 | Pinard et al. |
| 5,903,825 A | 5/1999 | Goode et al. |
| 5,973,681 A | 10/1999 | Tanigawa et al. |
| 6,167,099 A | 12/2000 | Rader et al. |
| 6,345,764 B1 | 2/2002 | Knowles |
| 6,384,744 B1 | 5/2002 | Philyaw et al. |
| 6,745,937 B2 | 6/2004 | Walsh et al. |
| 6,751,470 B1 | 6/2004 | Ella et al. |
| 6,823,388 B1 | 11/2004 | Philyaw et al. |
| 6,908,034 B2 | 6/2005 | Alleshouse |
| 6,911,945 B2 | 6/2005 | Korva |
| 6,937,196 B2 | 8/2005 | Korva |
| 6,961,544 B1 | 11/2005 | Hagstrom |
| 7,072,690 B2 | 7/2006 | Shin et al. |
| 7,159,214 B2 | 1/2007 | Rajaram et al. |
| 7,161,357 B2 | 1/2007 | Lee et al. |
| 7,190,728 B2 | 3/2007 | Kawada et al. |
| 7,202,776 B2 | 4/2007 | Breed |
| 7,202,819 B2 | 4/2007 | Hatch |
| 7,218,678 B2 | 5/2007 | Katta et al. |
| 7,251,499 B2 | 7/2007 | Ella et al. |
| 7,265,731 B2 | 9/2007 | Vance et al. |
| 7,283,094 B2 | 10/2007 | Lee |
| 7,307,331 B2 | 12/2007 | Kipnis et al. |
| 7,333,067 B2 | 2/2008 | Hung et al. |
| 7,367,514 B2 | 5/2008 | Soule, III et al. |
| 7,368,311 B2 | 5/2008 | Tilmans et al. |
| 7,423,599 B2 | 9/2008 | Li et al. |
| 7,446,717 B2 | 11/2008 | Hung et al. |
| 7,466,274 B2 | 12/2008 | Lin et al. |
| 7,586,387 B2 | 9/2009 | Van Delden |
| 7,592,957 B2 | 9/2009 | Achour et al. |
| 7,617,342 B2 | 11/2009 | Rofougaran |
| 7,696,929 B2 | 4/2010 | Kaneda |
| 7,741,965 B2 | 6/2010 | Lai et al. |
| 7,750,435 B2 | 7/2010 | Rofougaran et al. |
| 7,764,232 B2 | 7/2010 | Achour et al. |
| 7,795,700 B2 | 9/2010 | Rofougaran et al. |
| 7,809,329 B2 | 10/2010 | Rofougaran et al. |
| 7,835,157 B2 | 11/2010 | Tilmans et al. |
| 7,839,216 B2 | 11/2010 | Alidio et al. |
| 7,839,236 B2 | 11/2010 | Dupuy et al. |
| 7,847,739 B2 | 12/2010 | Achour et al. |
| 7,855,696 B2 | 12/2010 | Gummalla et al. |
| 7,874,483 B2 | 1/2011 | Wang et al. |
| 7,885,600 B2 | 2/2011 | Rofougaran et al. |
| 7,893,790 B2 | 2/2011 | Van Delden |
| 7,899,394 B2 | 3/2011 | Rofougaran et al. |
| 7,903,724 B2 | 3/2011 | Rofougaran et al. |
| 7,907,597 B2 | 3/2011 | Lee et al. |
| 7,908,420 B2 | 3/2011 | Rofougaran et al. |
| 7,917,129 B2 | 3/2011 | Souisse et al. |
| 8,141,784 B2 | 3/2012 | Wang et al. |
| 8,165,070 B2 | 4/2012 | Salminen |
| 8,185,152 B1 | 5/2012 | Goldner |
| 8,190,156 B2 | 5/2012 | Rantanen et al. |
| 8,214,536 B2 | 7/2012 | Zhao |
| 8,223,717 B2 | 7/2012 | Dillon et al. |
| 8,238,905 B2 | 8/2012 | Jiang |
| 8,250,207 B2 | 8/2012 | Raleigh |
| 8,254,337 B2 | 8/2012 | Zhong et al. |
| 8,396,076 B2 * | 3/2013 | Borella ................ H04W 36/14 370/338 |
| 8,596,533 B2 | 12/2013 | Qu et al. |
| 9,231,644 B2 | 1/2016 | Wang et al. |
| 9,485,802 B2 | 11/2016 | Wang et al. |
| 9,775,190 B2 * | 9/2017 | Wang ................ G06K 7/10297 |
| 2002/0055368 A1 | 5/2002 | Lee |
| 2002/0066788 A1 | 6/2002 | Knowles |
| 2002/0183013 A1 | 12/2002 | Auckland et al. |
| 2004/0249915 A1 | 12/2004 | Russell |
| 2005/0128152 A1 | 6/2005 | Milosavljevic |
| 2005/0156796 A1 | 7/2005 | Nysen |
| 2005/0271133 A1 | 12/2005 | Waxman |
| 2006/0025102 A1 | 2/2006 | Kipnis et al. |
| 2006/0070089 A1 | 3/2006 | Shoaib et al. |
| 2006/0128332 A1 | 6/2006 | van Rooyen et al. |
| 2006/0135084 A1 | 6/2006 | Lee |
| 2006/0261821 A1 | 11/2006 | Lee et al. |
| 2006/0261938 A1 | 11/2006 | Lai et al. |
| 2006/0279446 A1 | 12/2006 | Wang et al. |
| 2007/0015058 A1 | 1/2007 | Takezawa et al. |
| 2007/0060089 A1 | 3/2007 | Owen et al. |
| 2007/0152058 A1 | 7/2007 | Yeakley et al. |
| 2007/0257847 A1 | 11/2007 | Su et al. |
| 2008/0042847 A1 | 2/2008 | Hollister et al. |
| 2008/0048917 A1 | 2/2008 | Achour et al. |
| 2008/0076383 A1 | 3/2008 | Barrett et al. |
| 2008/0107213 A1 | 5/2008 | Gupta et al. |
| 2008/0150807 A1 | 6/2008 | Lin et al. |
| 2008/0150829 A1 | 6/2008 | Lin et al. |
| 2008/0157897 A1 | 7/2008 | Tilmans et al. |
| 2008/0181186 A1 | 7/2008 | Rofougaran et al. |
| 2008/0181287 A1 | 7/2008 | Rofougaran et al. |
| 2008/0182613 A1 | 7/2008 | Rofougaran et al. |
| 2008/0203167 A1 | 8/2008 | Soule et al. |
| 2008/0237341 A1 | 10/2008 | Fleck et al. |
| 2008/0258981 A1 | 10/2008 | Achour et al. |
| 2008/0258993 A1 | 10/2008 | Gummalla et al. |
| 2008/0297404 A1 | 12/2008 | Lin et al. |
| 2009/0006677 A1 | 1/2009 | Rofougaran et al. |
| 2009/0024550 A1 | 1/2009 | Wynn et al. |
| 2009/0028082 A1 | 1/2009 | Wynn et al. |
| 2009/0032592 A1 | 2/2009 | Christensen |
| 2009/0033359 A1 | 2/2009 | Rofougaran et al. |
| 2009/0036067 A1 | 2/2009 | Rofougaran et al. |
| 2009/0037627 A1 | 2/2009 | Rofougaran et al. |
| 2009/0058734 A1 | 3/2009 | Ali et al. |
| 2009/0067388 A1 | 3/2009 | van Rooyen et al. |
| 2009/0073065 A1 | 3/2009 | Jordan |
| 2009/0074106 A1 | 3/2009 | See et al. |
| 2009/0115549 A1 | 5/2009 | Lee |

(56) References Cited

U.S. PATENT DOCUMENTS

| | | |
|---|---|---|
| 2009/0121951 A1 | 5/2009 | Kaneda |
| 2009/0128446 A1 | 5/2009 | Gummalla et al. |
| 2009/0135087 A1 | 5/2009 | Gummalla et al. |
| 2009/0148074 A1 | 6/2009 | Xu et al. |
| 2009/0160575 A1 | 6/2009 | Dupuy et al. |
| 2009/0160578 A1 | 6/2009 | Achour |
| 2009/0167457 A1 | 7/2009 | Melde et al. |
| 2009/0180403 A1 | 7/2009 | Tudosoiu |
| 2009/0218657 A1 | 9/2009 | Rofougaran et al. |
| 2009/0219213 A1 | 9/2009 | Lee et al. |
| 2009/0227205 A1 | 9/2009 | Rofougaran et al. |
| 2009/0245146 A1 | 10/2009 | Gummalla et al. |
| 2009/0251385 A1 | 10/2009 | Xu et al. |
| 2009/0285135 A1 | 11/2009 | Rousu et al. |
| 2009/0289737 A1 | 11/2009 | Itoh et al. |
| 2009/0295473 A1 | 12/2009 | Dupuy et al. |
| 2009/0295483 A1 | 12/2009 | Alidio et al. |
| 2009/0295660 A1 | 12/2009 | Xu et al. |
| 2009/0316612 A1 | 12/2009 | Poilasne et al. |
| 2009/0322490 A1 | 12/2009 | Kung et al. |
| 2009/0323783 A1 | 12/2009 | Buris et al. |
| 2010/0022195 A1 | 1/2010 | Rofougaran et al. |
| 2010/0045554 A1 | 2/2010 | Xu et al. |
| 2010/0060544 A1 | 3/2010 | Penev et al. |
| 2010/0073254 A1 | 3/2010 | Lee et al. |
| 2010/0077115 A1 | 3/2010 | Rofougaran et al. |
| 2010/0079347 A1 | 4/2010 | Hayes et al. |
| 2010/0109805 A2 | 5/2010 | Achour |
| 2010/0109971 A2 | 5/2010 | Gummalla et al. |
| 2010/0109972 A2 | 5/2010 | Xu et al. |
| 2010/0110943 A2 | 5/2010 | Gummalla et al. |
| 2010/0117908 A2 | 5/2010 | Lee et al. |
| 2010/0123635 A1 | 5/2010 | Lopez et al. |
| 2010/0127085 A1 | 5/2010 | Yamagajo et al. |
| 2010/0157858 A1 | 6/2010 | Lee et al. |
| 2010/0171563 A1 | 7/2010 | Dupuy et al. |
| 2010/0176880 A2 | 7/2010 | Dupuy et al. |
| 2010/0207703 A1 | 8/2010 | Dupuy et al. |
| 2010/0225554 A1 | 9/2010 | Huang et al. |
| 2010/0231464 A1 | 9/2010 | Huang et al. |
| 2010/0231470 A1 | 9/2010 | Lee et al. |
| 2010/0232474 A1 | 9/2010 | Rofougaran et al. |
| 2010/0238075 A1 | 9/2010 | Pourseyed |
| 2010/0238081 A1 | 9/2010 | Achour et al. |
| 2010/0276498 A1 | 11/2010 | Rofougaran et al. |
| 2010/0283692 A1 | 11/2010 | Achour et al. |
| 2010/0283705 A1 | 11/2010 | Achour et al. |
| 2010/0285634 A1 | 11/2010 | Rofougaran et al. |
| 2010/0291924 A1 | 11/2010 | Antrim et al. |
| 2011/0026624 A1 | 2/2011 | Gummalla et al. |
| 2011/0039501 A1 | 2/2011 | Achour et al. |
| 2011/0047603 A1 | 2/2011 | Gordon et al. |
| 2011/0050364 A1 | 3/2011 | Achour |
| 2011/0066774 A1 | 3/2011 | Rofougaran et al. |
| 2011/0068873 A1 | 3/2011 | Alidio et al. |
| 2011/0095950 A1 | 4/2011 | Yu |
| 2011/0095964 A1 | 4/2011 | Pathak et al. |
| 2011/0109402 A1 | 5/2011 | Dupuy et al. |
| 2011/0116424 A1 | 5/2011 | Sauerwein, Jr. et al. |
| 2011/0136457 A1 | 6/2011 | Yu |
| 2011/0148586 A1 | 6/2011 | Anderson et al. |
| 2011/0153349 A1 | 6/2011 | Anderson et al. |
| 2011/0174877 A1 | 7/2011 | Fleck et al. |
| 2011/0176528 A1 | 7/2011 | Lu et al. |
| 2011/0191484 A1 | 8/2011 | Babbar et al. |
| 2011/0206002 A1 | 8/2011 | Jeon et al. |
| 2011/0306386 A1 | 12/2011 | Centoza et al. |
| 2011/0319072 A1 | 12/2011 | Ekici et al. |
| 2012/0003976 A1 | 1/2012 | Bhat et al. |
| 2012/0047269 A1 | 2/2012 | Leonov et al. |
| 2012/0058752 A1 | 3/2012 | Souissi et al. |
| 2012/0089845 A1 | 4/2012 | Raleigh |
| 2012/0100823 A1 | 4/2012 | Chen et al. |
| 2012/0134291 A1 | 5/2012 | Raleigh |
| 2012/0165056 A1 | 6/2012 | Kim et al. |
| 2012/0196579 A1 | 8/2012 | Souissi et al. |
| 2012/0196644 A1 | 8/2012 | Scherzer et al. |
| 2012/0197792 A1 | 8/2012 | Raleigh |
| 2012/0203677 A1 | 8/2012 | Raleigh |
| 2012/0207134 A1 | 8/2012 | Karaoguz et al. |
| 2012/0210391 A1 | 8/2012 | Raleigh |
| 2012/0224694 A1 | 9/2012 | Lu et al. |
| 2013/0043980 A1 | 2/2013 | Havens et al. |
| 2013/0043981 A1 | 2/2013 | Wang et al. |

OTHER PUBLICATIONS

C.T.-C. Nguyen; "Vibrating RF MEMS for low power communications (invited);" Proceedings; 2002 MRS Fall Meeting; Boston, Massachusetts; pp. J12.1.1-J2-1.12.

Feb. 21, 2011 Extended Search Report issued in European Patent Application No. 10191449.1.

Feb. 1, 2011 Partial Search Report issued in European Patent Application No. 10176444.7.

Greenwood et al; "Dynamic Dispatching and Transport Optimization—Real-World Experience with Perspectives on Pervasive Technology Integration;" Proceedings of the 42nd Hawaii International Conference on System Sciences; 2009; pp. 1-9.

Lee et al; "Influence of Automatic Level Control on Micromechanical Resonator Oscillator Phase Noise;" Proceedings; 2003 IEEE Int. Frequency Control Symposium; pp. 341-349.

Dec. 7, 2010 Notice of Amendment issued in Chinese Patent Application No. 201010544113.X.

"Researchers Win $3.5 Million to Improve Wireless;" Georgia Institute of Technology: Nanoscience and Nanotechnology; obtained Aug. 5, 2010 from www.nano.gatech.edu/news/release.php.

May 9, 2016 Office Action issued in European Patent Application No. 10 176 444.7.

\* cited by examiner

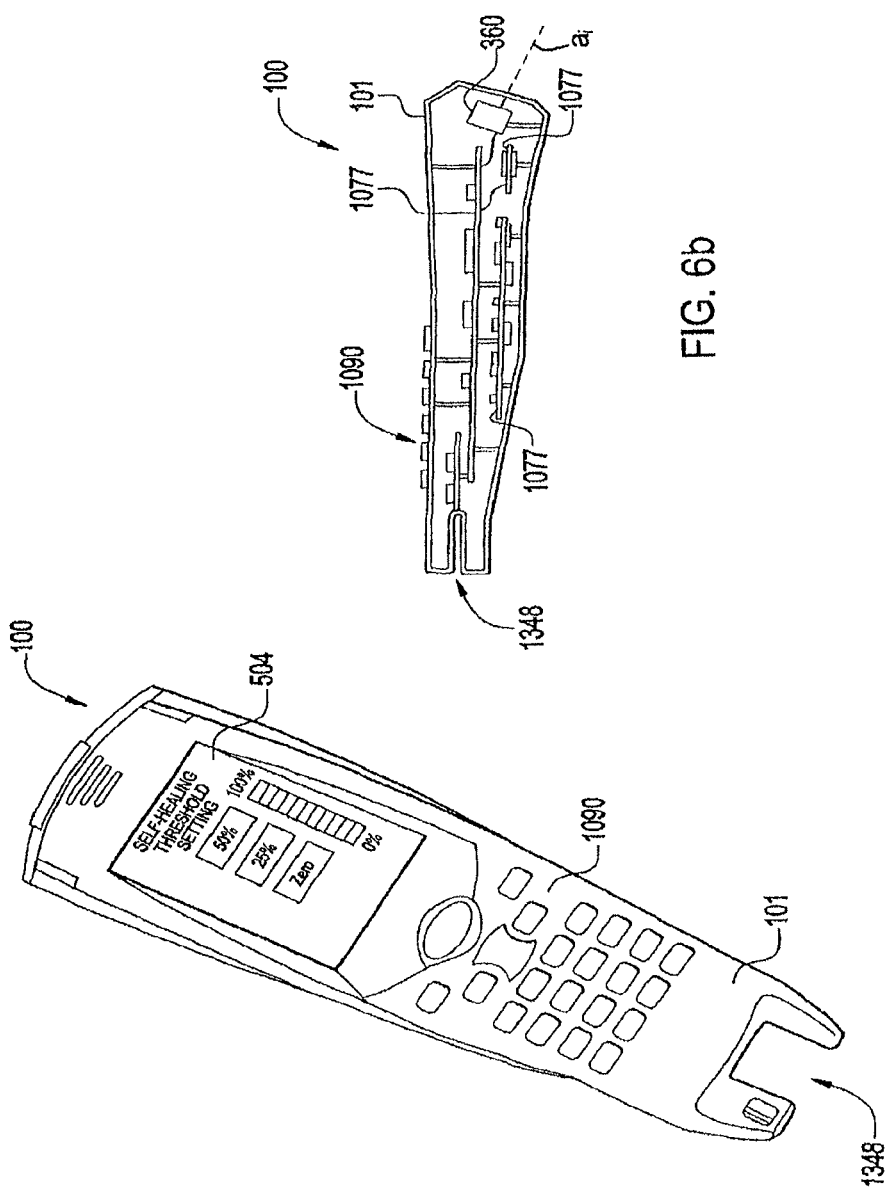

ENCODED INFORMATION READING TERMINAL WITH USER-CONFIGURABLE MULTI-PROTOCOL WIRELESS COMMUNICATION INTERFACE

CROSS REFERENCE TO RELATED APPLICATIONS

This application is a continuation of U.S. patent application Ser. No. 15/338,501 filed Oct. 31, 2016, which is a continuation of U.S. patent application Ser. No. 14/964,718 filed Dec. 10, 2015, which is a continuation of U.S. patent application Ser. No. 14/560,043 filed Dec. 4, 2014, which is a continuation of U.S. patent application Ser. No. 14/199,120 filed Mar. 6, 2014, which is a continuation of U.S. patent application Ser. No. 13/430,121 filed Mar. 26, 2012 which is a divisional application of U.S. patent application Ser. No. 12/567,158 filed Sep. 25, 2009. The above applications are incorporated herein by reference in their entireties.

FIELD OF THE INVENTION

The invention is generally related to encoded information reading (EIR) terminals and is specifically related to an EIR terminal comprising a multi-protocol wireless communication interface.

BACKGROUND OF THE INVENTION

Encoded information reading (EIR) terminals equipped with wireless communication interfaces are widely used in retail stores, shipping facilities, etc. While wireless communication of EIR terminals offers many advantages as compared to wired communications, traditional wireless communication interfaces have noticeable shortcomings, e.g., by failing to support more than one communication protocol and/or standard.

Accordingly, there is a need for further advances in EIR terminals and systems which would support multiple communication protocols and standards.

SUMMARY OF THE INVENTION

In one embodiment, there is provided an encoded information reading (EIR) terminal comprising a microprocessor electrically coupled to a system bus, a memory communicatively coupled to the microprocessor, an encoded information reading (EIR) device, and a wireless communication interface.

The EIR device can be selected from the group consisting of a bar code reading device, an RFID reading device, and a card reading device. The EIR device can be configured to perform outputting raw message data containing an encoded message and/or outputting decoded message data corresponding to an encoded message.

The wireless communication interface can comprise a radio frequency front end configured to perform receiving a first radio signal and/or transmitting a second radio signal. The radio frequency front end can be electrically coupled to an analog-to-digital converter (ADC) which can be electrically coupled to the system bus and/or to a digital-to-analog converter (DAC) which can be electrically coupled to the system bus.

The microprocessor can be configured to execute a base-band encoder software program and/or a base-band decoder software program. The base-band encoder software program can be configured to produce a first encoded bit stream by performing at least one of the following functions: source encoding of a first bit stream, encryption, channel encoding, multiplexing, modulation, frequency spreading, and media access control. The DAC can be configured to output to the radio frequency front end an analog signal corresponding to the first encoded bit stream.

The ADC can be configured to output a second encoded bit stream corresponding to an analog signal produced by the radio frequency front end. The base-band decoder software program can be configured to produce a second bit stream corresponding to the second encoded bit stream by performing at least one of the following functions: media access control, frequency de-spreading, de-modulation, de-multiplexing, channel decoding, decryption, and source decoding.

In another embodiment, there is provided an encoded information reading terminal comprising a microprocessor electrically coupled to a system bus, a memory communicatively coupled to the microprocessor, an encoded information reading (EIR) device, and a wireless communication interface.

The EIR device can be selected from the group consisting of a bar code reading device, an RFID reading device, and a card reading device. The EIR device can be configured to perform outputting raw message data containing an encoded message and/or outputting decoded message data corresponding to an encoded message.

The wireless communication interface can comprise an RF front end configured to perform receiving a first radio signal and/or transmitting a second radio signal. The RF front can be end electrically coupled to an analog-to-digital converter (ADC) which can be electrically coupled to the system bus and/or to a digital-to-analog converter (DAC) which can be electrically coupled to the system bus.

The EIR terminal can be configured to execute a wireless communication protocol selector software program, which can optimize a value of a user-defined criterion in order to dynamically select a wireless communication network, a wireless communication protocol, and/or a parameter of a wireless communication protocol.

In another embodiment, there is provided an encoded information reading terminal comprising a microprocessor electrically coupled to a system bus, a memory communicatively coupled to the microprocessor, an encoded information reading (EIR) device, and a wireless communication interface.

The EIR device can be selected from the group consisting of a bar code reading device, an RFID reading device, and a card reading device. The EIR device can be configured to perform outputting raw message data containing an encoded message and/or outputting decoded message data corresponding to an encoded message.

The wireless communication interface can comprise an RF front end configured to perform receiving a first radio signal and/or transmitting a second radio signal. The RF front can be end electrically coupled to an analog-to-digital converter (ADC) which can be electrically coupled to the system bus and/or to a digital-to-analog converter (DAC) which can be electrically coupled to the system bus.

The EIR terminal can be configured to dynamically select a wireless communication network, a wireless communication protocol, and/or a parameter of a wireless communication protocol responsive a user action and/or to scanning a pre-defined bar code.

In another embodiment, there is provided an encoded information reading terminal comprising a microprocessor electrically coupled to a system bus, a memory communicatively coupled to the microprocessor, an encoded information reading (EIR) device, and a wireless communication interface configured to support at least two wireless communication protocols.

The EIR device can be selected from the group consisting of a bar code reading device, an RFID reading device, and a card reading device. The EIR device can be configured to perform outputting raw message data containing an encoded message and/or outputting decoded message data corresponding to an encoded message.

The EIR terminal can be configured to execute a wireless communication protocol selector software program, which can optimize a value of a user-defined criterion in order to dynamically select a wireless communication network, a wireless communication protocol, and/or a parameter of a wireless communication protocol.

In a further embodiment, there is provided an encoded information reading terminal comprising a microprocessor electrically coupled to a system bus, a memory communicatively coupled to the microprocessor, an encoded information reading (EIR) device, and a wireless communication interface configured to support at least two wireless communication protocols.

The EIR device can be selected from the group consisting of a bar code reading device, an RFID reading device, and a card reading device. The EIR device can be configured to perform outputting raw message data containing an encoded message and/or outputting decoded message data corresponding to an encoded message.

The EIR terminal can be configured to dynamically select a wireless communication network, a wireless communication protocol, and/or a parameter of a wireless communication protocol responsive a user action and/or to scanning a pre-defined bar code.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 6a and 6b illustrate an exemplary hand held EIR terminal housing;

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
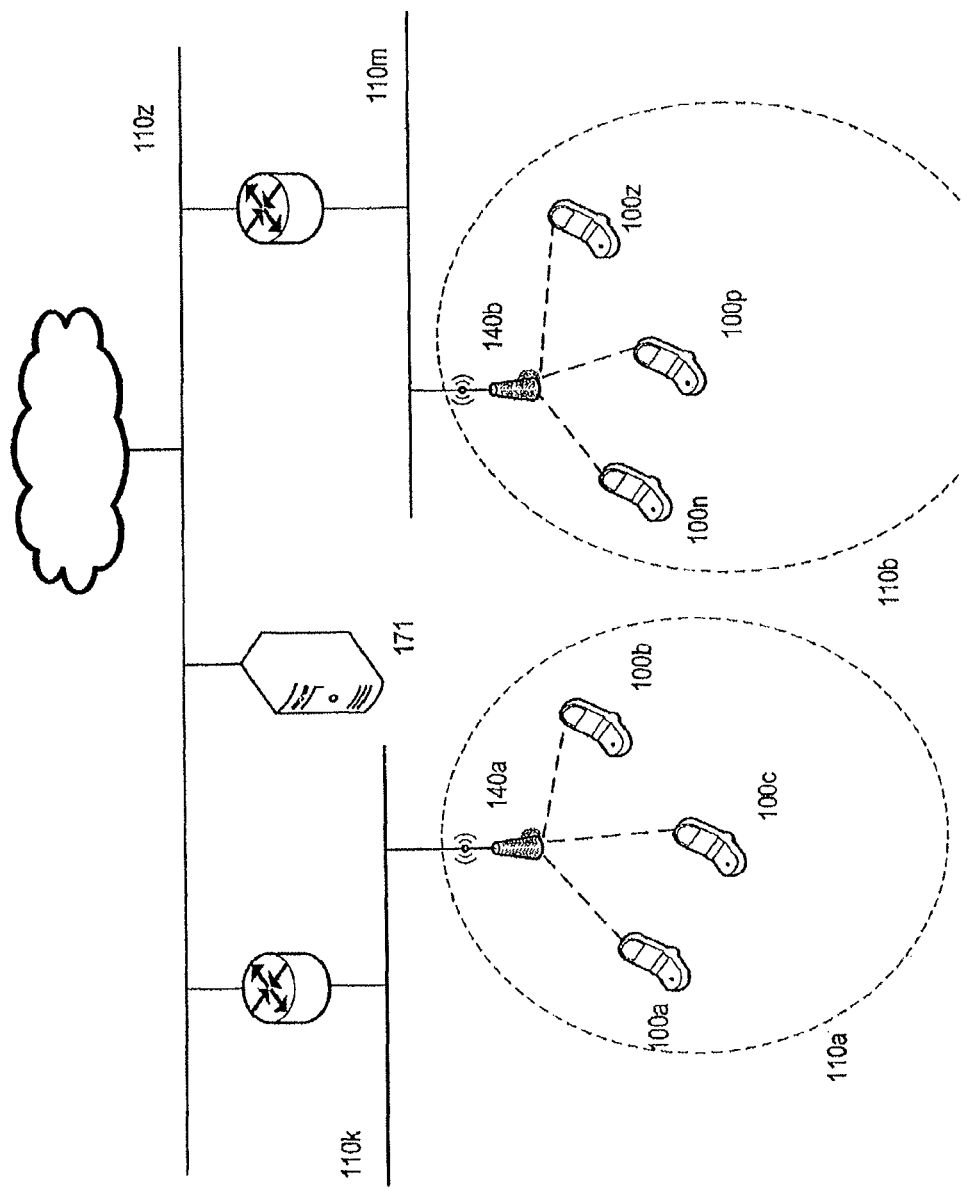
FIG. 1 depicts a network level layout of a data collection system employing EIR terminal according to the invention.

There is provided an encoded information reading (EIR) terminal for incorporation in a data collection system. The data collection system, schematically shown in FIG. 1, can include a plurality of EIR terminals 100a-100z in communication with a plurality of interconnected networks 110a-110z. In one aspect, the plurality of networks 110a-110z can include at least one IEEE 802.11 conformant wireless network. In another aspect, an EIR terminal 100a can be in communication with at least one wireless device over Bluetooth™ wireless communication protocol. In a further aspect, the plurality of networks 110a-110z can include at least one GSM wireless network. In a further aspect, the plurality of networks 110a-110z can include at least one CDMA wireless network. Still further, the plurality of networks 110a-110z can include at least one 3G wireless network, e.g., UMTS, HSUPA/HSDPA, or CDMA2000EvDO. In another aspect, the plurality of networks 110a-110z can include at least one 4G wireless network, e.g., LTE, UWB, or 802.16m (WiMax). A skilled artisan would appreciate the fact that wireless networks implementing other wireless communication protocols are within the spirit and the scope of the invention.

In one aspect, an EIR terminal can comprise a wireless communication interface. The EIR terminal 100c can establish a communication session with the host computer 171. In one embodiment, network frames can be exchanged by the EIR terminal 100c and the host computer 171 via one or more routers, base stations, and other infrastructure elements. In another embodiment, the host computer 171 can be reachable by the EIR terminal 100c via a local area network (LAN). In a yet another embodiment, the host computer 171 can be reachable by the EIR terminal 100c via a wide area network (WAN). A skilled artisan would appreciate the fact that other methods of providing interconnectivity between the DR terminal 100c and the host computer 171 relying upon LANs, WANs, virtual private networks (VPNs), and/or other types of network are within the spirit and the scope of the invention.

In a further aspect, the wireless communication interface can be configured to support at least two wireless communication protocols. In one embodiment, the wireless communication interface can be configured to support HSPA/GSM/GPRS/EDGE protocol family and CDMA/EV-DO protocol family. A skilled artisan would appreciate the fact that wireless communication interfaces supporting other communication protocols are within the spirit and the scope of the invention.

In one embodiment, the communications between the EIR terminal 100c and the host computer 171 can comprise a series of HTTP requests and responses transmitted over one or more TCP connections, although a person skilled in the art would appreciate the fact that using other transport and application level protocols is within the scope and the spirit of the invention.

In one aspect, at least one of the messages transmitted by the EIR terminal can include decoded message data corresponding to, e.g., a bar code label or an RFID label attached to a product or to a shipment item. For example, an EIR terminal can transmit a request to the host computer to retrieve product information corresponding to a product identifier encoded by a bar code label attached to the product, or to transmit an item tracking record for an item identified by a bar code label attached to the product.

Figure 2:
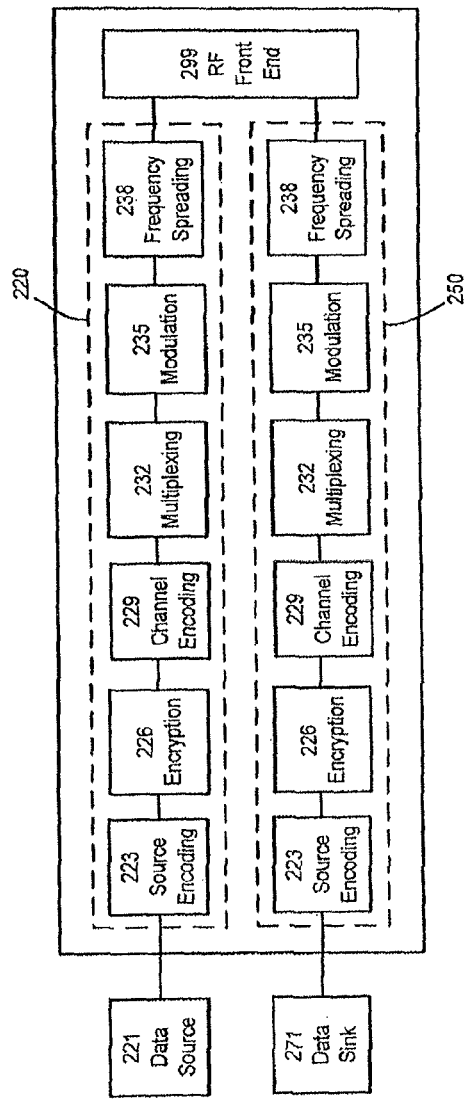
FIG. 2 depicts a functional layout of a wireless communication interface.

A wireless communication interface 210 best viewed in FIG. 2, can comprise a transmitter circuit 220 electrically coupled to a data source 221. The transmitter circuit 220 can be implemented by one or more specialized microchips, and can perform the following functions: source encoding 223, encryption 226, channel encoding 229, multiplexing 232, modulation 235, and frequency spreading 238.

The wireless communication interface 210 of FIG. 2 can further comprise a receiver circuit 250 electrically coupled to the data sink 271. The receiver circuit 250 can be implemented by one or more specialized microchips, and can perform the following functions: frequency de-spreading 253, demodulation 256, de-multiplexing 259, channel decoding 262, decryption 265, and source decoding 268.

Each of the transmitter circuit 220 and receiver circuit 250 can be electrically coupled to a radio frequency (RF) front end 299. The RF front end 299 can be used to convert high frequency RF signals to/from base-band or intermediate frequency signals. A skilled artisan would appreciate the fact that RF front ends of different data rates, sensitivities, output powers, operating frequencies, and measurement resolutions are within the scope and spirit of the invention.

On the receiving side, the RF front-end 299 can include all filters, low-noise amplifiers (LNAs), and down-conversion mixer(s) needed to process modulated RF signals received by the antenna into based-band signals. In one embodiment, the receiving part of the RF front end 299 can comprise one or more of the following components:

- a first matching circuit to transfer to the next stage the energy received by the antenna;
- a band-pass filter (BPF) to knock down out-of-band jammers;
- a second matching circuit at the input of a low-noise amplifier (LNA);
- the LNA, the primary responsibility of which is to set the sensitivity of the receiver, by providing a high gain;
- a third matching circuit between the LNA output and the receive (RX) mixer (down-converter);
- the down-conversion RX mixer.

On the transmitting side, the RF frond-end area can be described as a "mirrored" version of a receiver. The front end of a transmitter up converts an outgoing base-band signal and then feeds the signal to a high power amplifier. A skilled artisan would appreciate the fact that other ways of implementing the RF front end are within the spirit and the scope of the invention.

According to one embodiment of the invention, the wireless communication interface supporting at least two wireless communication protocols can be implemented using a single dual-protocol (or multi-protocol) chipset. The chipset can include integrated circuits (ICs), application specific integrated circuits (ASICs), and/or other components providing the necessary functionality.

In another embodiment, the wireless communication interface supporting at least two wireless communication protocols can be implemented using two or more chipsets. Each of the chipsets can include integrated circuits (ICs), application specific integrated circuits (ASICs), and/or other components providing the necessary functionality.

Figure 3:
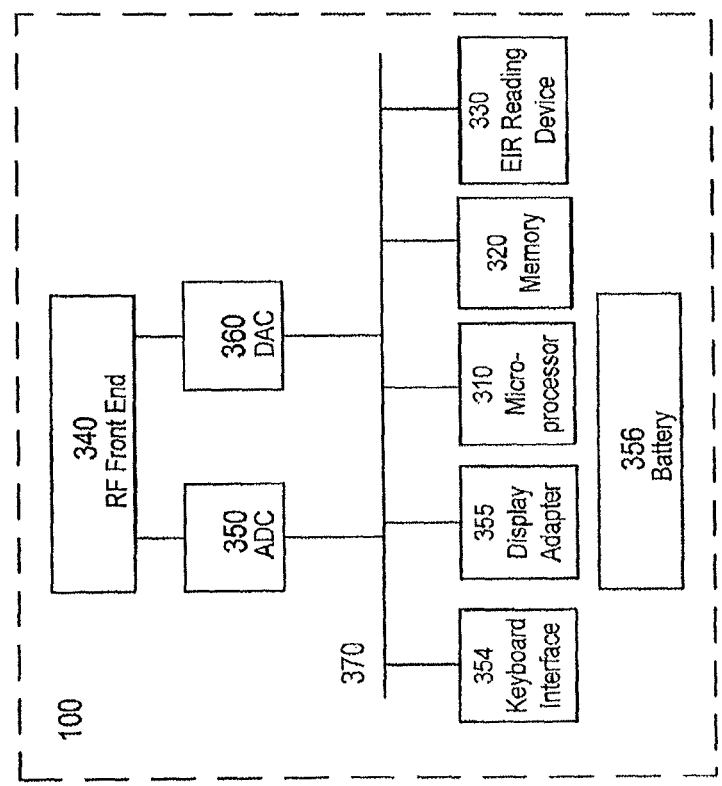
FIG. 3 depicts a component level layout of an EIR terminal according to the invention.

In a yet another embodiment, at least some of the functions of the transmitter circuit and the receiver circuit can be advantageously performed by one or more software programs executed by a microprocessor. In one embodiment the EIR terminal 100 can comprise at least one microprocessor 310 and a memory 320, both coupled to the system bus 370, as best viewed in FIG. 3.

The microprocessor 310 can be provided by a general purpose microprocessor or by a specialized microprocessor (e.g., an ASIC). In one embodiment, the EIR terminal 100 can comprise a single microprocessor which can be referred to as a central processing unit (CPU) and which can perform at least some of the functions of the transmitter circuit and the receiver circuit. In another embodiment, the EIR terminal 100 can comprise two or more microprocessors; for example, a CPU providing some or most of the EIR functionality and a specialized microprocessor performing some of the functions of the transmitter circuit and the receiver circuit. A skilled artisan would appreciate the fact that different schemes of processing tasks distribution among the two or more microprocessors are within the spirit and the scope of the invention.

The EIR terminal 100 can further comprise one or more encoded information reading (EIR) devices 330, including a bar code reading device, an RFID reading device, and a card reading device, also coupled to the system bus 370. In one embodiment, an EIR reading device can be capable of outputting decoded message data corresponding to an encoded message. In another embodiment, the EIR reading device can output raw message data containing an encoded message, e.g., raw image data or raw RFID data.

Of course, devices that read bar codes, read RFID, or read cards bearing encoded information may read more than one of these categories while remaining within the scope of the invention. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that reads bar codes for purposes of the present invention The EIR terminal 100 can further comprise a keyboard interface 354 and a display adapter 355, both also coupled to the system bus 370. The EIR terminal 100 can further comprise a battery 356.

In a further aspect, the EIR terminal 100 can further comprise an RF front end 340. In a further aspect, the EIR terminal 100 can further comprise an analog-to-digital (ADC) converter 350, the input of which can be electrically coupled to the RF front end 340. The choice of ADC can be determined by the receiver architecture, and can depend upon the selectivity of the filters, the dynamic range afforded by the front-end amplifiers, and the bandwidth and type of modulation to be processed. For example, the level or dynamic range of signals expected to be presented to the ADC will dictate the bit resolution needed for the converter. An ADC can also be specified in terms of its spurious-free dynamic range (SFDR). The ADC's sensitivity can be influenced by wideband noise, including spurious noise, and can be improved through the use of an anti-aliasing filter at the input of the ADC to eliminate sampling of noise and high-frequency spurious products. To avoid aliasing when converting analog signals to the digital domain, the ADC sampling frequency must be at least twice the maximum frequency of the input analog signal. This minimum sampling condition derived from Nyquist's theorem, must be met in order to capture enough information about the input analog waveform to reconstruct it accurately. In addition to selecting an ADC for IF or baseband sampling, the choice of buffer amplifier to feed the input of the converter can affect the performance possible with a given sampling scheme. The buffer amplifier should provide the rise/fall time and transient response to preserve the modulation information of the IF or base-band signals, while also providing the good amplitude accuracy and flatness needed to provide signal amplitudes at an optimum input level to the ADC for sampling.

In another embodiment, the EIR terminal 100 can further comprise a digital-to-analog (DAC) converter 360, the output of which can be electrically coupled to the RF front end 340. In a further aspect, a DAC can be viewed as a component providing a function reversed to that of an ADC.

In a further aspect, the output of the ADC 350, and the input of the DAC 360 can be electrically coupled to a system bus 370. A skilled artisan would appreciate the fact that other microprocessors, memory, and/or peripheral devices can be electrically coupled to the system bus 370 without departing from the scope and the spirit of the invention.

In another aspect, the microprocessor 310 can execute a base-band encoder software program which can encode a bit stream which needs to be transmitted over a wireless medium. The encoded bit stream outputted by the base-band encoder software program can be fed to the input of the DAC 360. The analog signal representative of the encoded bit stream can be outputted by the DAC 360 to the RF front end 340 in order to be transmitted over a wireless medium.

Figure 4:
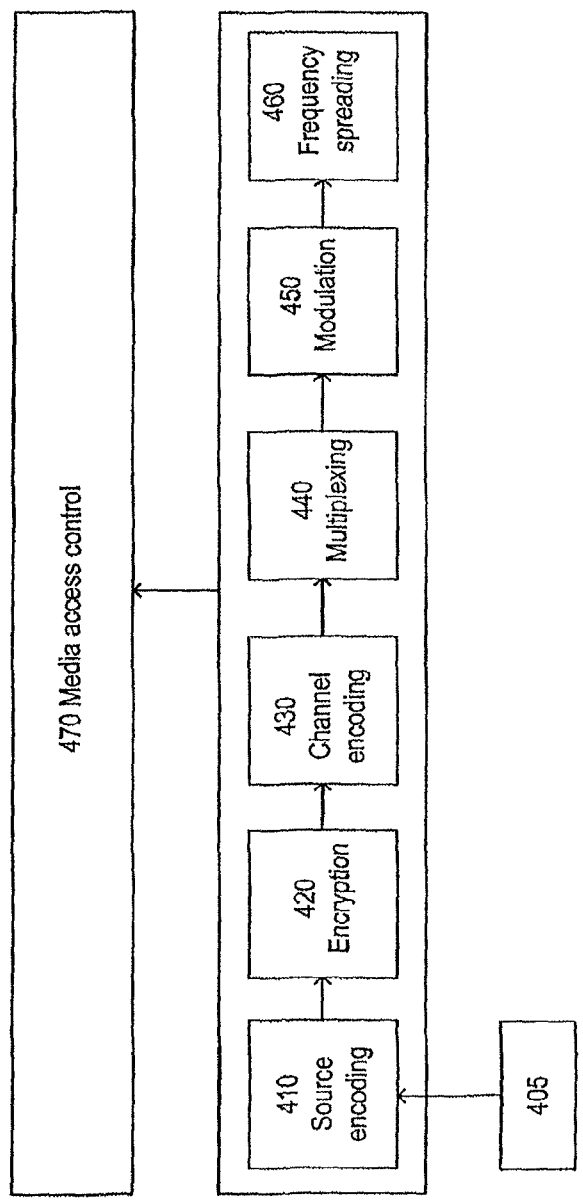
FIG. 4 illustrates the functions of the base-band encoder software program according to the invention.

In one embodiment, the base-band encoder software program 400 can perform at least one of the following functions schematically shown in FIG. 4: source encoding 410 of a bit stream 405, encryption 420, channel encoding 430, multiplexing 440, modulation 450, frequency spreading 460, and media access control 470. In one embodiment, the remaining functions (i.e., those not implemented by the base-band encoder software program) can be implemented by one or more dedicated hardware components.

In one aspect, the source encoding function 410 can be provided by a process of encoding information using a different number of bits (or other information bearing units) than an un-encoded representation would use, through use of specific encoding schemes.

In another aspect, the encryption function 420 can be implemented by using an algorithm (cipher) suitable to transform an unencrypted ("plain text") information stream to an encrypted information stream.

In a further aspect, the channel encoding function 430 can be provided by a process suitable to encode the transmitted information stream into a form, which would allow guaranteed reliable information transmission at a rate close to the maximum channel capacity. According to the Shannon theorem, for a given bandwidth and signal-to-noisy ratio, the theoretical maximum channel capacity (reliable information transfer rate) for a particular noise level is defined by the following equation:

$$C = B\log_2\left(1 + \frac{S}{N}\right).$$

For any information transmission rate R<C, there exists an encoding scheme that would allow the probability of errors at the receiver to be made less than a pre-defined value ε. The channel encoding function 430 can select and/or implement an encoding scheme for a pre-defined value of ε.

In a further aspect, the multiplexing function 440 can be employed to combine multiple signals or data streams into one signal transmitted over a shared physical transmission medium (wireless channel). The multiplexing function 440 can implement one or more of the multiplexing technologies including TDMA (Time division multiple access), FDMA (Frequency division multiple access), CDMA (Code division multiple access), CSMA (Carrier sense multiple access), etc.

In a further aspect, the frequency spreading function 460 can implement one or more of the following technologies: DSSS (Direct Sequence Spread Spectrum), FHSS (Frequency Hopping Spread Spectrum), and OFDM (Orthogonal Frequency Division Multiplexing).

In a further aspect, the media access control function 470 can provide addressing and channel access control mechanisms.

In another aspect, the RF front end 340 can output to the ADC 350 an analog signal representative of a signal received over the wireless medium. The ADC 350 can output a digital signal representative of the analog signal outputted by the RF front end 340. The microprocessor 310 can execute a base-band decoder software program which can input the digital signal outputted by the ADC 350 and can decode the digital signal into a form suitable for further processing by other software programs.

Figure 5:
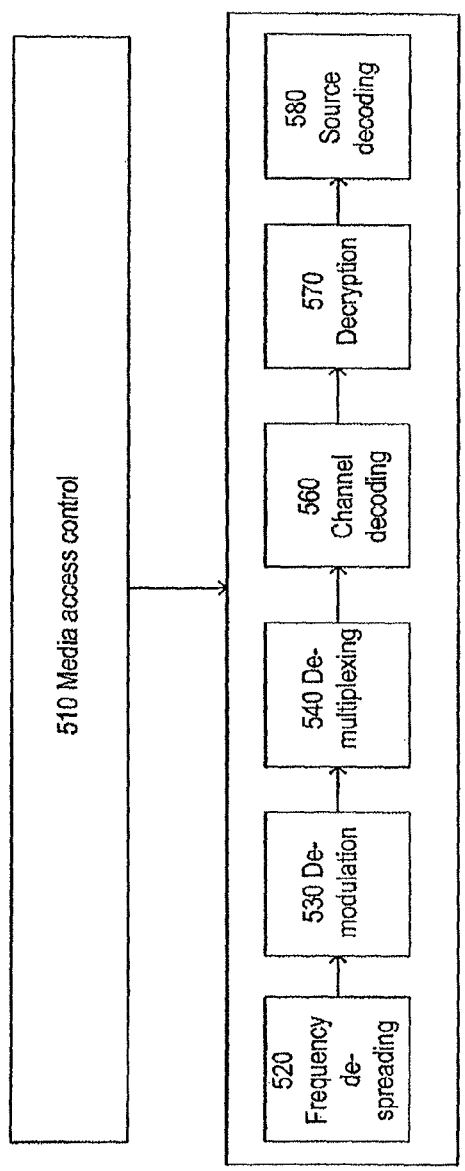
FIG. 5 illustrates the functions of the base-band encoder software program according to the invention.

In a further aspect, the base-band decoder software program 500 can perform at least at least one of the following functions schematically shown in FIG. 5: media access control 510, frequency de-spreading 520, de-modulation 530, de-multiplexing 540 the analog signal, channel decoding 560, decryption 570, and source decoding 580. In one embodiment, the remaining functions (i.e., those not implemented by the base-band decoder software program) can be implemented by one or more dedicated hardware components.

In one aspect, each of the frequency de-spreading 520, de-modulation 530, de-multiplexing 540, channel decoding 560, decryption 570, and source decoding 580 functions can be implemented as a reverse function of the frequency spreading 460, modulation 450, multiplexing 440, channel encoding 430, encryption 420, source encoding 410 functions, respectively.

In another aspect, the base-band encoder software program can be implemented as two or more software programs. In another aspect, the base-band decoder software program can be implemented as two or more software programs. In a further aspect, the base-band encoder software program and the base-band decoder software program can be implemented as a single software program.

In another aspect, due to advantageously performing at least some of the source bit stream encoding functions by a software program, the EIR terminal 100 can be devoid of dedicated hardware components configured to implement at least one of the following functions: source encoding of said first bit stream, encryption, channel encoding, multiplexing, modulation, frequency spreading, and media access control.

In another aspect, due to advantageously performing at least some of the analog signal decoding functions by a software program, the EIR terminal 100 can be devoid of dedicated hardware components configured to implement at least one of the following functions: media access control, frequency de-spreading, de-modulation, de-multiplexing, channel decoding, decryption, and source decoding.

In a further aspect, the EIR terminal 100 can be configured to dynamically select a wireless communication network, a wireless communication protocol, or one or more parameters of the wireless communication protocol (e.g., frequency or transmission power) to be used by the RF front end 340.

Due to its ability to dynamically select a wireless communication network and a wireless communication protocol, the EIR terminal 100 according to the present invention can be advantageously used, e.g., by a company operating in several geographies with different wireless communication standards. Using the EIR terminal 100 according to the present invention would allow such a company to deploy the same EIR terminal 100 model in all the geographies.

In one embodiment, selection of a wireless communication network, a wireless communication protocol, or one or more parameters of a wireless communication protocol can be performed manually by the user of the EIR terminal 100. In one embodiment, the selection can be performed by scanning a pre-defined bar code. In another embodiment, the selection can be performed by the user interacting with the user interface (e.g., via a graphical user interface (GUI), or via a hardware-implemented control). A skilled artisan would appreciate the fact that other methods of manually selecting a wireless communication network, a wireless communication protocol, or one or more parameters of the wireless communication protocol are within the scope and the spirit of the invention.

In another embodiment, selection of a wireless communication network, a wireless communication protocol, or one or more parameters of the wireless communication protocol can be performed by a wireless communication protocol selector software program executed by the EIR terminal 100. The wireless communication protocol selector software program can optimize a value of a user-defined criterion.

In one embodiment, the value of the user-defined criterion can be calculated based on one or more of the following parameters: frequency range, network status, signal strength, service cost, communication channel throughput, and user preferences. The user preferences can be represented, e.g., by network preference, service preference, protocol preference, or frequency preference. A skilled artisan would appreciate the fact that other types of user preferences are within the spirit and the scope of the invention.

In one embodiment, the value of the user-defined criterion can be calculated as a weighted sum of components each of which is represented by either a parameter itself (e.g., the signal strength) or a difference between the value of a parameter and the desired value of the parameter (e.g., communication channel throughput). In another embodiment, the value of the user-defined criterion can be calculated as a square root of a weighted sum of squares of components each of which is represented by either a parameter itself (e.g., the signal strength) or a difference between the value of a parameter and the desired value of the parameter (e.g., communication channel throughput). A skilled artisan would appreciate the fact that other methods of calculating the user-defined criterion value are within the scope and spirit of the invention.

For example, if a user is more concerned about the cost than about other communication parameters, the user would want the user-defined criterion to yield the cheapest covered service provider (while the bandwidth, frequency range, and/or network protocol can possibly be secondary factors affecting the service provider and/or network selection). In another example, if a user is more concerned about the signal quality than about other communication parameters, the user would want the user-defined criterion to yield the network with best quality (while the cost can be a secondary factor affecting the service provider and/or network selection). In a yet another example, if a user is more concerned about maintaining uninterrupted communication session than about other communication parameters, the user would want the user-defined criterion to yield the network with best connection reliability (while the bandwidth, frequency range, and/or network protocol can possibly be secondary factors affecting the service provider and/or network selection). A skilled artisan would appreciate the fact that other methods of defining the user-defined criterion are within the scope and the spirit of the invention.

In one embodiment, the EIR terminal 100 can be configured to search beacon signals over a pre-defined frequency range (e.g., between 800 MHz and 5 GHz), and then select a wireless communication network and/or frequency channel which would produce the optimal value of the user-defined criterion.

In one embodiment, the value of the user-defined criterion can be calculated immediately before the EIR terminal 100 attempts to initiate a communication session, so that a wireless communication network and/or a wireless communication protocol can be chosen which would optimize the user-defined criterion.

In another embodiment, the value of the user-defined criterion can be calculated periodically at established time intervals so that the EIR terminal 100 can change the wireless communication network and/or the wireless communication protocol between communication sessions or during a communication session if a wireless communication network and/or a wireless communication protocol is detected yielding a value of the user-defined criterion which is closer to the optimum than that of the current network or protocol. In yet another embodiment, the value of a user-defined criterion can be calculated responsive to a pre-defined event (e.g., the signal quality falling below a pre-defined level, or the signal quality exceeding a pre-defined threshold), so that the EIR terminal 100 can automatically (i.e., without user intervention) change the wireless communication network and/or the wireless communication protocol between communication sessions or during a communication session. Thus, the EIR terminal 100 can always maintain a network connection irrespectively of changing external conditions (e.g., when the terminal is physically moved).

Form factors and housings for the EIR terminal 100 according to the invention are now being described. The components of EIR terminal 100 can be incorporated into a variety of different housings. As indicated by the embodiment of FIGS. 6a and 6b, the components of FIG. 5 can be incorporated into a hand held housing 101. EIR terminal 100 of FIGS. 6a and 6b is in the form factor of a hand held portable data terminal. EIR terminal 100 as shown in FIGS. 6a and 6b includes a keyboard 1090, a display 504 having an associated touch screen overlay, a card reader 1348, and an imaging module 360 which includes the components of imaging assembly as described herein; namely, image sensor array incorporated on an image sensor IC chip. Imaging module 360 has an associated imaging axis, $a_i$. As indicated by the side view of FIG. 6b, the components of the block diagram of FIG. 5 may be supported within housing 101 on a plurality of circuit boards 1077. Imaging module 360 may include an image sensor array having color sensitive pixels as described in U.S. Provisional Patent Application Nos. 60/687,606, filed Jun. 3, 2005, 60/690,268, filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference.

Figure 7B:
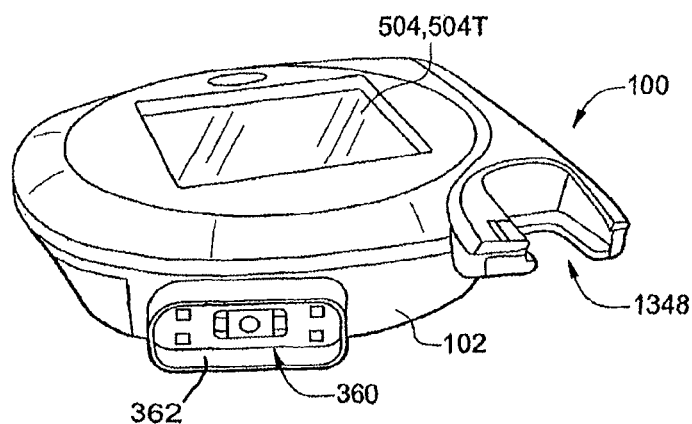
FIGS. 7a-7c illustrate an exemplary portable and remountable EIR terminal housing.
Figure 7A:
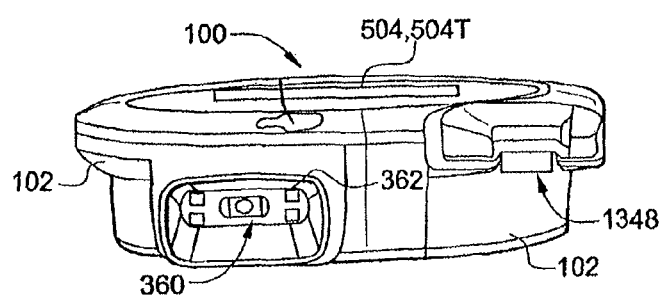
Figure 7C:
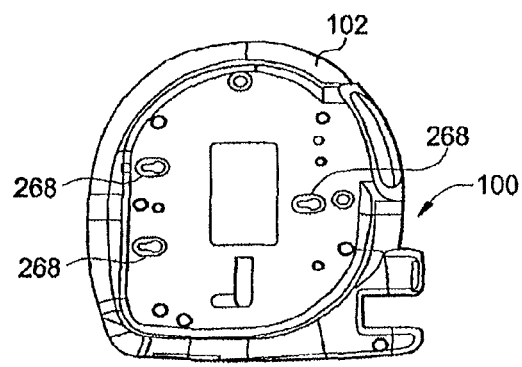

In the embodiment of FIGS. 7a-7c, the EIR terminal 100 is in the form of a transaction terminal which may be configured as a retail purchase transaction terminal or as a price verifier. Housing 102 of the transaction terminal shown in FIGS. 7a-7c is configured to be portable so that it can be moved from location to location and is further configured to be replaceably mounted on a fixed structure such as a fixed structure of a cashier station or a fixed structure of the retail store floor (e.g., a shelf, a column 264 best viewed in FIG. 8b). Referring to bottom view of FIG. 7c, the housing 102 of the EIR terminal 100 has formations 268 facilitating the replaceable mounting of EIR terminal 100 on a fixed structure. Referring now to FIG. 7b, EIR terminal 100 includes a display 504 having an associated touch screen 504T, a card reader 1348, an imaging module 360, and a luminous shroud 362. When light from the illumination block (not shown in FIG. 8) strikes luminous shroud 362, the shroud glows to attract attention to the location of imaging assembly. In certain operating modes as indicated in FIG. 8c, the EIR terminal 100 in accordance with any of FIGS. 7a-7c, displays on display 504 a PIN entry screen prompting a customer to enter PIN information into touch screen 504T. In other operating modes, as indicated in FIG. 8d, the EIR terminal 100 displays on display 504 a signature prompt screen prompting a customer to enter signature information into the device with use of a stylus 505.

Figure 8A:
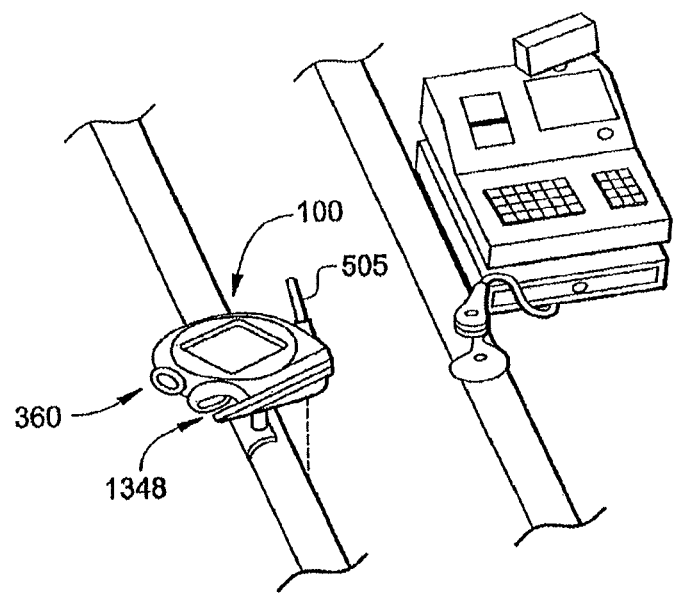
FIG. 8a illustrates a first exemplary deployment of an EIR terminal according to the invention within a retail store.
Figure 8B:
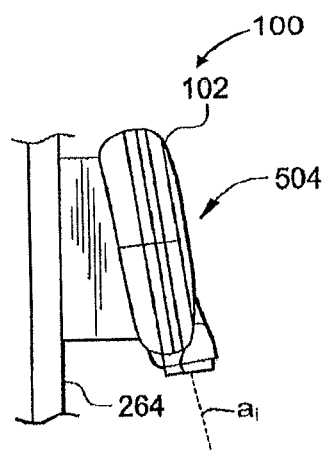
FIG. 8b illustrates a second exemplary deployment of an EIR terminal according to the invention within a retail store.
Figure 8C:
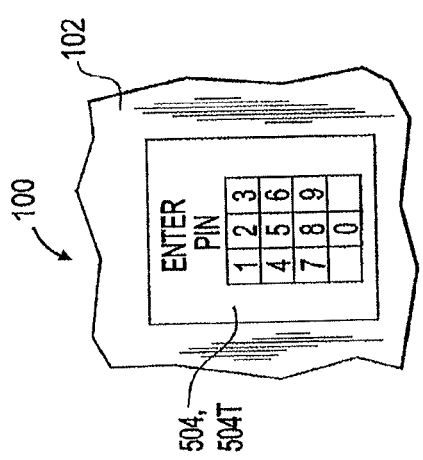
FIGS. 8c and 8d illustrate PIN and signature data entry operational modes of an EIR terminal according to the invention.
Figure 8D:
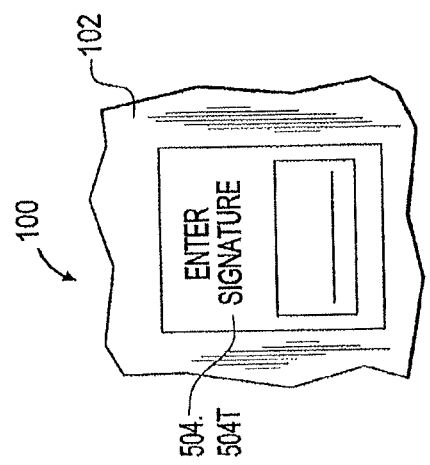

Referring to FIGS. 8a and 8b, various installation configurations for the EIR terminal of FIGS. 7a-7c are shown. In the view of FIG. 8a, the EIR terminal 100 is installed as a retail purchase transaction terminal at a point of sale cashier station. In the setup of FIG. 8a, the EIR terminal 100 is configured as a retail purchase transaction terminal and is utilized to aid and facilitate retail transactions at a point of sale. A customer may enter a credit card or a debit card into card reader 1348 and retail purchase transaction terminal may transmit the credit card information to credit/debit authorization network.

In the view of FIG. 8b, the EIR terminal 100 is configured as a price verifier to aid customers in checking prices of products located on a store floor. EIR terminal 100 may be mounted on a shelf (not shown in FIG. 8b) or on a column 254 or other fixed structure of the retail store. EIR terminal 100 may decode bar code data from bar codes on store products and transmit decoded out bar code messages to a store server for lookup of price information which is sent back from the store server to terminal 100 for display on display 504.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. An encoded information reading (EIR) terminal comprising:

a microprocessor electrically coupled to a system bus;

a memory communicatively coupled to said microprocessor;

an encoded information reading (EIR) device selected from the group consisting of a bar code reading device, an RFID reading device, and a card reading device, said EIR device configured to perform at least one of outputting raw message data containing an encoded message and outputting decoded message data corresponding to an encoded message; and a wireless communication interface comprising a radio frequency front end configured to perform at least one of receiving a first radio signal and transmitting a second radio signal, said radio frequency front end electrically coupled to at least one of an analog-to-digital converter (ADC) electrically coupled to said system bus and a digital-to-analog converter (DAC) electrically coupled to said system bus;

wherein said microprocessor is configured to execute at least one of a base-band encoder software program and a base-band decoder software program;

wherein said base-band encoder software program is configured to produce a first encoded bit stream by performing at least one of the following functions: source encoding of a first bit stream, encryption, channel encoding, multiplexing, modulation, frequency spreading, and media access control;

wherein said DAC is configured to output to said radio frequency front end an analog signal corresponding to said first encoded bit stream;

wherein said ADC is configured to output a second encoded bit stream corresponding to an analog signal produced by said radio frequency front end; and wherein said base-band decoder software program is configured to produce a second bit stream corresponding to said second encoded bit stream by performing at least one of the following functions: media access control, frequency de-spreading, de-modulation, de-multiplexing, channel decoding, decryption, and source decoding.

A2. The EIR terminal of claim A1, wherein said EIR terminal is devoid of dedicated hardware components configured to implement at least one of the following functions: source encoding of said first bit stream, encryption, channel encoding, multiplexing, modulation, frequency spreading, media access control, frequency de-spreading, de-modulation, de-multiplexing, channel decoding, decryption, and source decoding.

A3. The EIR terminal of claim A1, wherein said base-band encoder software program and said base-band decoder software program are implemented as a single software program.

A4. The EIR terminal of claim A1, wherein said base-band encoder software program is performed by at least one of a general purpose microprocessor, a specialized microprocessor.

A5. The EIR terminal of claim A1, wherein said base-band decoder software program is performed by at least one of a general purpose microprocessor, a specialized microprocessor.

A6. The EIR terminal of claim A1 further comprising a central processing unit (CPU);

wherein said base-band encoder software program is performed by at least one of said CPU, a specialized microprocessor.

A7. The EIR terminal of claim A1 further comprising a central processing unit (CPU);

wherein said base-band decoder software program is performed by at least one of said CPU, a specialized microprocessor.

A8. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol.

A9. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said value of said user-defined criterion is calculated based on at least one of network status, communication quality, signal strength, service cost, bandwidth, a user preference, and communication channel throughput.

A10. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said value of said user-defined criterion is calculated as a weighted sum of components, at least one of said components represented by at least one of a network status, communication quality, signal strength, service cost, bandwidth, a user preference, and communication channel throughput.

A11. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said value of said user-defined criterion is calculated as a weighted sum of components, at least one of said components represented by a difference between an actual value and a desired value of at least one of a network status, communication quality, signal strength, service cost, bandwidth, and communication channel throughput.

A12. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said value of said user-defined criterion is calculated as a square root of a weighted sum of squares of components, at least one of said components represented by at least one of a network status, communication quality, signal strength, service cost, bandwidth, a user preference, and communication channel throughput.

A13. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said value of said user-defined criterion is calculated as a square root of a weighted sum of squares of components, at least one of said components represented by a difference between an actual value and a desired value of at least one of network status, communication quality, signal strength, service cost, bandwidth, a user preference, and communication channel throughput.

A14. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said EIR terminal is configured to search beacon signals over a pre-defined frequency range, and then select at least one of a wireless communication network and frequency channel which optimizes said user-defined criterion.

A15. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said EIR terminal is configured to evaluate said user-defined criterion before attempting to initiate a communication session.

A16. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said EIR terminal is configured to switch at least one of said wireless communication network and said wireless communication protocol responsive to evaluating said user-defined criterion.

A17. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said EIR terminal is configured to evaluate said user-defined criterion responsive to a pre-defined event.

A18. The EIR terminal of claim A1 further comprising a wireless communication protocol selector software program, said wireless communication protocol software program configured to optimize a value of a user-defined criterion in order to dynamically select at least one of a wireless communication network, a wireless communication protocol, and a parameter of a wireless communication protocol;

wherein said EIR terminal is configured to periodically evaluate said user-defined criterion.

A19. The EIR terminal of claim A1 further configured to dynamically select at least one of a wireless communication network, a wireless communication protocol, and a parameter of a wireless communication protocol responsive to a user action.

A20. The EIR terminal of claim A1 further configured to dynamically select at least one of a wireless communication network, a wireless communication protocol, and a parameter of a wireless communication protocol responsive to scanning a pre-defined bar code.

B1. An encoded information reading terminal comprising:
  a microprocessor electrically coupled to a system bus;
  a memory communicatively coupled to said microprocessor;
  an encoded information reading (EIR) device selected from the group consisting of a bar code reading device, an RFID reading device, and a card reading device, said EIR device configured to perform at least one of outputting raw message data containing an encoded message and outputting decoded message data corresponding to an encoded message; and
  a wireless communication interface comprising an RF front end configured to perform at least one of receiving a first radio signal and transmitting a second radio signal, said RF front end electrically coupled to at least one of an analog-to-digital converter (ADC) electrically coupled to said system bus and a digital-to-analog converter (DAC) electrically coupled to said system bus;
  wherein said microprocessor is configured to execute at least one of a base-band encoder software program and a base-band decoder software program;
  wherein said EIR terminal is configured to execute a wireless communication protocol selector software program, said wireless communication protocol selector software program configured optimize a value of a user-defined criterion in order to dynamically select at least one of a wireless communication network, a wireless communication protocol, and a parameter of a wireless communication protocol.

B2. The EIR terminal of claim B1, wherein said base-band encoder software program and said base-band decoder software program are implemented as a single software program.

B3. The EIR terminal of claim B1, wherein said base-band encoder software program is performed by at least one of a general purpose microprocessor, a specialized microprocessor.

B4. The EIR terminal of claim B1, wherein said base-band decoder software program is performed by at least one of a general purpose microprocessor, a specialized microprocessor.

B5. The EIR terminal of claim B1 further comprising a central processing unit (CPU);
  wherein said base-band encoder software program is performed by at least one of said CPU, a specialized microprocessor.

B6. The EIR terminal of claim B1 further comprising a central processing unit (CPU);
  wherein said base-band decoder software program is performed by at least one of said CPU, a specialized microprocessor.

B7. The EIR terminal of claim B1, wherein said value of said user-defined criterion is calculated based on at least one of network status, communication quality, signal strength, service cost, bandwidth, a user preference, and communication channel throughput.

B8. The EIR terminal of claim B1, wherein said value of said user-defined criterion is calculated as a weighted sum of components, at least one of said components represented by at least one of network status, communication quality, signal strength, service cost, bandwidth, a user preference, and communication channel throughput.

B9. The EIR terminal of claim B1, wherein said value of said user-defined criterion is calculated as a weighted sum of components, at least one of said components represented by a difference between an actual value and a desired value of at least one of network status, communication quality, signal strength, service cost, bandwidth, and communication channel throughput.

B10. The EIR terminal of claim B1, wherein said value of said user-defined criterion is calculated as a square root of a weighted sum of squares of components, at least one of said components represented by at least one of network status, communication quality, signal strength, service cost, bandwidth, a user preference, and communication channel throughput.

B11. The EIR terminal of claim B1, wherein said value of said user-defined criterion is calculated as a square root of a weighted sum of squares of components, at least one of said components represented by a difference between an actual value and a desired value of at least one of network status, communication quality, signal strength, service cost, bandwidth, a user preference, and communication channel throughput.

B12. The EIR terminal of claim B1, wherein said EIR terminal is configured to search beacon signals over a pre-defined frequency range, and then select at least one of a wireless communication network and frequency channel which optimizes said user-defined criterion.

B13. The EIR terminal of claim B1, wherein said EIR terminal is configured to evaluate said user-defined criterion before attempting to initiate a communication session.

B14. The EIR terminal of claim B1, wherein said EIR terminal is configured to switch at least one of said wireless communication network and said wireless communication protocol responsive to evaluating said user-defined criterion.

B15. The EIR terminal of claim B1, wherein said EIR terminal is configured to evaluate said user-defined criterion responsive to a pre-defined event.

B16. The EIR terminal of claim B1 further configured to periodically evaluate said user-defined criterion.

B17. The EIR terminal of claim B1 further configured to dynamically select at least one of a wireless communication network, a wireless communication protocol, and a parameter of a wireless communication protocol responsive to a user action.

B18. The EIR terminal of claim B1 further configured to dynamically select at least one of a wireless communication network, a wireless communication protocol, and a parameter of a wireless communication protocol responsive to scanning a pre-defined bar code.

C1. An encoded information reading terminal comprising:
  a microprocessor electrically coupled to a system bus;
  a memory communicatively coupled to said microprocessor;
  an encoded information reading (EIR) device selected from the group consisting of a bar code reading device, an RFID reading device, and a card reading device, said EIR device configured to perform at least one of outputting raw message data containing an encoded message and outputting decoded message data corresponding to an encoded message; and a wireless communication interface comprising an RF front end configured to perform at least one of receiving a first radio signal and transmitting a second radio signal, said RF front end electrically coupled to at least one of an analog-to-digital converter (ADC) electrically coupled to said system bus and a digital-to-analog converter (DAC) electrically coupled to said system bus;

wherein said microprocessor is configured to execute at least one of a base-band encoder software program and a base-band decoder software program;

wherein said EIR terminal is configured to dynamically select at least one of a wireless communication network, a wireless communication protocol, and a parameter of a wireless communication protocol responsive to at least one of a user action, scanning a pre-defined bar code.

C2. The EIR terminal of claim C1, wherein said base-band encoder software program is performed by at least one of a general purpose microprocessor, a specialized microprocessor.

C3. The EIR terminal of claim C1, wherein said base-band decoder software program is performed by at least one of a general purpose microprocessor, a specialized microprocessor.

C4. The EIR terminal of claim C1 further comprising a central processing unit (CPU);

wherein said base-band encoder software program is performed by at least one of said CPU, a specialized microprocessor.

C5. The EIR terminal of claim C1 further comprising a central processing unit (CPU);

wherein said base-band decoder software program is performed by at least one of said CPU, a specialized microprocessor.

D1. An encoded information reading terminal comprising:
a microprocessor electrically coupled to a system bus;
a memory communicatively coupled to said microprocessor;
an encoded information reading (EIR) device selected from the group consisting of a bar code reading device, an RFID reading device, and a card reading device, said EIR device configured to perform at least one of outputting raw message data containing an encoded message and outputting decoded message data corresponding to an encoded message; and
a wireless communication interface configured to support at least two wireless communication protocols;
wherein said EIR terminal is configured to execute a wireless communication protocol selector software program, said wireless communication protocol selector software program configured optimize a value of a user-defined criterion in order to dynamically select at least one of a wireless communication network, a wireless communication protocol, and a parameter of a wireless communication protocol.

D2. The EIR terminal of claim D1, wherein said wireless communication interface is implemented using a single multi-protocol chipset.

D3. The EIR terminal of claim D1, wherein said wireless communication interface is implemented using two or more chipsets.

D4. The EIR terminal of claim D1, wherein said value of said user-defined criterion is calculated based on at least one of network status, communication quality, signal strength, service cost, bandwidth, a user preference, and communication channel throughput.

D5. The EIR terminal of claim D1, wherein said value of said user-defined criterion is calculated as a weighted sum of components, at least one of said components represented by at least one of network status, communication quality, signal strength, service cost, bandwidth, a user preference, and communication channel throughput.

D6. The EIR terminal of claim D1, wherein said value of said user-defined criterion is calculated as a weighted sum of components, at least one of said components represented by a difference between an actual value and a desired value of at least one of network status, communication quality, signal strength, service cost, bandwidth, and communication channel throughput.

D7. The EIR terminal of claim D1, wherein said value of said user-defined criterion is calculated as a square root of a weighted sum of squares of components, at least one of said components represented by at least one of network status, communication quality, signal strength, service cost, bandwidth, a user preference, and communication channel throughput.

D8. The EIR terminal of claim D1, wherein said value of said user-defined criterion is calculated as a square root of a weighted sum of squares of components, at least one of said components represented by a difference between an actual value and a desired value of at least one of network status, communication quality, signal strength, service cost, bandwidth, a user preference, and communication channel throughput.

D9. The EIR terminal of claim D1, wherein said EIR terminal is configured to search beacon signals over a pre-defined frequency range, and then select at least one of a wireless communication network and frequency channel which optimizes said user-defined criterion.

D10. The EIR terminal of claim D1, wherein said EIR terminal is configured to evaluate said user-defined criterion before attempting to initiate a communication session.

D11. The EIR terminal of claim D1, wherein said EIR terminal is configured to switch at least one of said wireless communication network and said wireless communication protocol responsive to evaluating said user-defined criterion.

D12. The EIR terminal of claim D1, wherein said EIR terminal is configured to evaluate said user-defined criterion responsive to a pre-defined event.

D13. The EIR terminal of claim D1 further configured to periodically evaluate said user-defined criterion.

D14. The EIR terminal of claim D1 further configured to dynamically select at least one of a wireless communication network, a wireless communication protocol, and a parameter of a wireless communication protocol responsive to a user action.

D15. The EIR terminal of claim D1 further configured to dynamically select at least one of a wireless communication network, a wireless communication protocol, and a parameter of a wireless communication protocol responsive to scanning a pre-defined bar code.

E1. An encoded information reading terminal comprising:
a microprocessor electrically coupled to a system bus;
a memory communicatively coupled to said microprocessor;
an encoded information reading (EIR) device selected from the group consisting of a bar code reading device, an RFID reading device, and a card reading device, said EIR device configured to perform at least one of outputting raw message data containing an encoded message and outputting decoded message data corresponding to an encoded message; and
a wireless communication interface configured to support at least two wireless communication protocols;

wherein said EIR terminal is configured to dynamically select at least one of a wireless communication network, a wireless communication protocol, and a parameter of a wireless communication protocol responsive to at least one of a user action, scanning a pre-defined bar code.

E2. The EIR terminal of claim E1, wherein said wireless communication interface is implemented using a single multi-protocol chipset.

E3. The EIR terminal of claim E1, wherein said wireless communication interface is implemented using two or more chipsets.

We claim:

1. A system comprising:
   an RF front end of a wireless communication interface of a terminal, the RF front end configured to perform at least one of: receiving a first radio signal and transmitting a second radio signal; and
   dynamically selecting at least one of a wireless communication protocol family including GSM protocol family or CDMA protocol family responsive to detecting a predefined user action.

2. The system of claim 1, further comprising executing at least one of a base-band encoder software program or a base-band decoder software program.

3. The system of claim 2, wherein the base-band encoder software program is executed by at least one of a general purpose microprocessor or a specialized microprocessor.

4. The system of claim 2, wherein the base-band decoder software program is executed by at least one of a general purpose microprocessor or a specialized microprocessor.

5. The system of claim 2, wherein the base-band encoder software program is executed by at least one of a central processing unit (CPU) or a specialized microprocessor.

6. The system of claim 2, wherein the base-band decoder software program is executed by at least one of a central processing unit (CPU) or a specialized microprocessor.

7. The system of claim 1, wherein the terminal comprises one of a bar code reading device, an RFID reading device, and a card reading device.

8. The system of claim 7, further comprising detecting the predefined user action, wherein the predefined user action comprises at least one of scanning a pre-defined bar code, scanning an RFID tag, and scanning a card.

9. The system of claim 1, wherein the terminal is configured to perform at least one of outputting raw message data containing an encoded message and outputting decoded message data corresponding to an encoded message.

10. The system of claim 1, wherein the GSM protocol family comprises of at least one of HSPA, GSM, GPRS, or EDGE.

11. The system of claim 1, wherein the CDMA protocol family comprises of at least one of CDMA or EV-DO.

12. A system comprising:
    a microprocessor electrically coupled to a system bus;
    a wireless communication interface configured to support at least two wireless communication protocols;
    wherein said system is configured to execute a wireless communication protocol selector software program, said wireless communication protocol selector software program configured to dynamically select at least one of a wireless communication protocol family including GSM protocol family or CDMA protocol family.

13. The system of claim 12, wherein said wireless communication interface is implemented using one of (1) a single multi-protocol chipset or (2) two or more chipsets.

14. The system of claim 12, wherein said value of said user-defined criterion is calculated based on at least one of network status, communication quality, signal strength, service cost, bandwidth, a user preference, and communication channel throughput.

15. The system of claim 12, wherein said value of said user-defined criterion is calculated as a weighted sum of components, at least one of said components represented by either:
    (A) at least one of network status, communication quality, signal strength, service cost, bandwidth, a user preference, and communication channel throughput; or
    (B) a difference between an actual value and a desired value of at least one of network status, communication quality, signal strength, service cost, bandwidth, and communication channel throughput.

16. The system of claim 12, wherein said value of said user-defined criterion is calculated as a square root of a weighted sum of squares of components, at least one of said components represented by at least one of network status, communication quality, signal strength, service cost, bandwidth, a user preference, and communication channel throughput.

17. The system of claim 12, wherein said value of said user-defined criterion is calculated as a square root of a weighted sum of squares of components, at least one of said components represented by a difference between an actual value and a desired value of at least one of network status, communication quality, signal strength, service cost, bandwidth, a user preference, and communication channel throughput.

18. The system of claim 12, wherein said system is configured to search beacon signals over a pre-defined frequency range, and then select at least one of a wireless communication network and frequency channel which optimizes said user-defined criterion.

19. The system of claim 12, wherein said system is configured to evaluate said user-defined criterion before attempting to initiate a communication session.

20. The system of claim 12, wherein said system is configured to switch at least one of said wireless communication network and said wireless communication protocol responsive to evaluating said user-defined criterion.

* * * * *